(12) United States Patent
Walz

(10) Patent No.: US 7,758,677 B2
(45) Date of Patent: Jul. 20, 2010

(54) FILTERING DEVICE

(75) Inventor: Stefan Walz, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 292 days.

(21) Appl. No.: 11/923,711

(22) Filed: Oct. 25, 2007

(65) Prior Publication Data
US 2009/0178565 A1    Jul. 16, 2009

(30) Foreign Application Priority Data
Oct. 25, 2006    (DE) .................. 20 2006 016 608 U

(51) Int. Cl.
F02M 35/02    (2006.01)
B01D 53/02    (2006.01)

(52) U.S. Cl. .............................. 96/134; 55/509; 55/527

(58) Field of Classification Search .................. 96/134, 96/135, 153; 55/385.3, 527; 123/518–520
See application file for complete search history.

(56) References Cited

U.S. PATENT DOCUMENTS

| | | | | |
|---|---|---|---|---|
| 3,633,343 A | * | 1/1972 | Mark ........................... | 96/118 |
| 4,318,720 A | * | 3/1982 | Hoggatt ....................... | 96/135 |
| 6,152,996 A | * | 11/2000 | Linnersten et al. ............ | 96/135 |
| 6,817,345 B2 | * | 11/2004 | Lawrence .................... | 123/518 |
| 6,997,977 B2 | * | 2/2006 | Dallas et al. ................. | 96/153 |
| 7,108,740 B2 | * | 9/2006 | Arno et al. ................... | 96/134 |
| 7,276,098 B2 | * | 10/2007 | Koslow ...................... | 55/385.3 |
| 2004/0065197 A1 | * | 4/2004 | LaBarge et al. ............... | 95/90 |
| 2006/0107836 A1 | * | 5/2006 | Maier et al. .................. | 96/134 |

FOREIGN PATENT DOCUMENTS

| | | |
|---|---|---|
| DE | 19604577 | 1/1997 |
| JP | 2001263177 A | 9/2001 |
| WO | WO96/23571 | 8/1996 |
| WO | WO2005095783 A1 | 10/2005 |

OTHER PUBLICATIONS

Search Report for German patent application DE 20 2006 016 608.4, mailed Aug. 2007.

* cited by examiner

*Primary Examiner*—Frank M Lawrence

(57) ABSTRACT

A filtering device has a filter hose that is arranged in a support pipe wherein between the outer side of the filter hose and the inner wall of the support pipe an annular chamber for the flow of the fluid to be purified is formed. Moreover, an adsorber unit for adsorption of residues is arranged in or on the support pipe.

13 Claims, 1 Drawing Sheet

FILTERING DEVICE

TECHNICAL FIELD

The invention concerns a filtering device, in particular for filtration of combustion air in internal combustion engines.

PRIOR ART

In Patent Abstracts of Japan JP-2001 263177 A an intake manifold of an internal combustion engine with integrated air filter is disclosed, wherein the supplied combustion air flows through the air filter and subsequently, downstream of the air filter, is supplied to the cylinder inlets of the internal combustion engine. The air filter comprises a filter element arranged in a filter housing that has connectors to the conduits of the intake manifold of the internal combustion engine. In order to prevent that after the engine has been shut down fuel vapors flow back through open intake valves of the engine into the intake manifold and accidentally are released into the atmosphere, adsorption units are arranged in the filter housing that have the task of adsorbing the fuel vapors. By coating the adsorption units, for example, with active carbon, a significant reduction of hydrocarbon emissions that propagate beginning at the internal combustion engine into the intake manifold can be achieved.

JP 2001 263177 A has adsorber units in the form of curved extensions that are pivotably secured on the inner wall of the housing and can be pivoted between an operative position in which the extensions project into the flow path and an inoperative position in which the extensions are pivoted out of the flow path. The pivoting action of the extensions represents a high constructive expenditure. Moreover, control devices for pivoting the extensions are required.

DISCLOSURE OF THE INVENTION

The invention has the object to provide with simple measures a filtering device that assist in reducing undesirable pollutant emissions from the fluid that is flowing back. In particular, the emission of hydrocarbons that, after switching off the internal combustion engine, flow back through the cylinder intakes into the intake manifold is to be reduced.

This object is solved according to the invention in that the filter element is embodied as a filter hose whose filter wall separates radially the unfiltered from the filtered side, in that the filter hose is received in a support pipe, wherein between the outer side of the filter hose and the inner wall of the support pipe an annular chamber for the flow of the fluid is formed, and in that the adsorber unit is arranged in or on the support pipe. The dependent claims provide expedient further embodiments The filtering device according to the invention comprises a filter element arranged in a filter housing as well as an adsorber unit that is arranged in the flow path of the fluid to be purified and serves for adsorption of pollutants contained in the fluid. The fluid to be purified expediently are gases, in particular the combustion air of an internal combustion engine, wherein in principle use of the filtering device for liquid fluids is possible also. In case of purification of combustion air for internal combustion engines the adsorption unit has the function to adsorb unburned combustion residues such as hydrocarbons that, after switching off the engine, propagate through the cylinder intakes into the intake manifold. The adsorption of these residues such as hydrocarbons on the adsorber unit aids in preventing or at least reducing emission into the atmosphere.

In the filtering device according to the invention the filter element is embodied as a flexible filter hose of soft and yielding filter material that is received in a support pipe wherein between the outer side of the filter hose and the inner wall of the support pipe an annular chamber for the flow of the fluid is formed. The support pipe including the filter hose received therein forms a flow passage for the fluid to be purified that can be inserted between two pipe sections or corresponding connectors, for example, in the intake manifold of an internal combustion engine. The support pipe is at the same time the housing of the filter element.

As a result of the flexibility of the filter hose, practically any geometry and course can be realized which enables an optimal space utilization, for example, in the motor compartment of a motor vehicle. The support pipe that is comprised in particular of plastic material is selected in accordance with the desired course. By means of the flexibility of the filter hose, the use of identical parts of the filter hose for different geometries of the support pipes is possible.

As material for the filter element, synthetic materials, for example, based on polymers, as well as natural materials, for example, cellulose fibers, are possible. According to an advantageous embodiment, the filter material of the filter hose has fibers of adsorption material admixed so that the filter element in addition to the mechanical separation of particles entrained in the unfiltered fluid also has an adsorption function for adsorption of in particular gaseous pollutants. In this embodiment, the filter element at the same time is the adsorption unit.

The filter hose that extends axially in the support pipe is flown through radially by the fluid to be purified for the filtration action. The annular chamber between the outer side of the filter hose and the inner wall of the support pipe can serve, for example, for dissipating the purified fluid; in this case, the unfiltered fluid is supplied via the interior of the filter hose and flows radially from the interior to the exterior through the filter wall into the annular chamber that represents the filtered side in this embodiment. Possible is also a flow through the filter hose wall in the opposite directions so that the unfiltered fluid is supplied through the annular chamber that in this embodiment represents the unfiltered side wherein the unfiltered fluid flows radially from the exterior to the interior through the filter wall and is dissipated axially through the interior of the filter hose that represents the filtered side.

The adsorber unit is supported by the support pipe; this can be realized by different embodiments. For example, according to the already mentioned embodiment it is possible to admix fibers to the filter material adsorber so that the filter material at the same time represents the adsorber unit. In at least one embodiment, the admixed fibers of the adsorber filter material include carbon fibers, for example active carbon. As discussed earlier in this specification, carbon fiber such as active carbon is advantageous for use as a hydrocarbon adsorption media to achieve a significant reduction in hydrocarbon emissions. According to another embodiment the adsorber unit is a separate component that is supported by the support pipe wherein an arrangement of the adsorber unit within the support pipe as well as outside of the support pipe but adjacent to the flow inlet and/or to the flow outlet of the support pipe is possible. In case of positioning the adsorber unit within the support pipe there are also different variants realizable, i.e., within the filter hose or outside the filter hose. In case of arrangement within the filter hose, the adsorber unit is expediently embodied in such a way that the inner side of the filter hose is lined by the adsorber unit wherein however an axial flow path in the filter hose is expediently left open.

Optionally, a complete filling of the flow cross-section of the filter hose is possible also. However, in case the adsorber unit is to be arranged outside of the filter hose, either an annular embodiment of the adsorber unit is possible, wherein the annular adsorber unit is located in the annular chamber between the outer side of the filter hose and the inner wall of the support pipe, or a positioning of an adsorber block axially before and/or behind the filter hose within the support pipe; in the latter embodiment it is advantageous to shorten the axial length of the filter hose relative to the axial length of the support pipe.

BRIEF DESCRIPTION OF THE DRAWINGS

Further advantages and expedient embodiments can be taken from the additional claims, the figure description, and the drawings. It is show in:

EMBODIMENTS OF THE INVENTION

Figure 1:
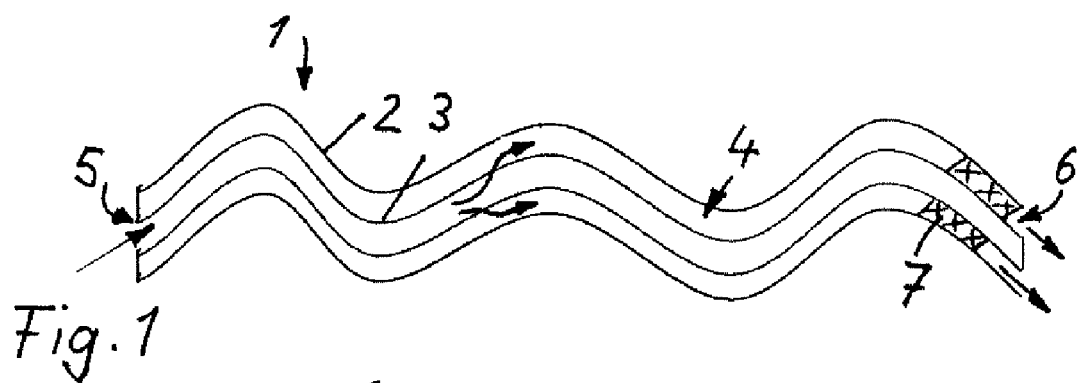
FIG. 1 a schematic illustration of a filtering device that can be utilized in particular for filtering combustion air in internal combustion engines, comprising a support pipe of solid material in which a flexible filter hose for filtering a fluid to be purified is arranged, wherein between outer side of the filter hose and inner wall of the support pipe an annular chamber for the flow of the fluid is formed, and comprising an annular adsorber unit in the annular chamber adjacent to the flow outlet of the filtering device.

The filtering device 1 illustrated in the figures comprises a flexible filter hose 3 arranged in a support pipe 2 of solid material, in particular, of plastic material, that extends axially across the same length as the support pipe 2. The fluid to be purified is supplied through the axial flow inlet 5 in the direction of the arrow to the filtering device 1; after filtration the purified fluid flows out through the oppositely positioned axial flow outlet 6 at the end face in the direction of the arrow. The filter hose 3 is comprised of a flexible yielding filter material that is formable in particular in the radial direction. In this way it is possible to use filter hoses that are embodied as identical parts for different geometries of support pipes. Embodiments of the filter hose with smooth plane walls as well as with folds in the filter wall are possible wherein the folds can extend exclusively in the axial direction as well as with a component of the fold edges transversely to the axial direction, i.e., in the circumferential direction. In an alternative embodiment the filter hose can be comprised of a rigid filter material in order to prevent collapse of the folds.

The filter hose 3 has a cylindrical cross-section; the support pipe 2 has preferably also a cylindrical cross-section. The cylindrical cross-section of the support pipe as well as of the filter hose remains at least substantially constant across the axial length of the filtering device. The diameter of the filter hose 3 is less than the diameter of the support pipe 2 so that between the outer side of the filter hose 3 and the inner wall of the support pipe 2 an annular chamber 4 is formed that extends across the axial length of the support pipe. This annular chamber provides a flow space for the fluid. In order to keep the filter hose 3 within the support pipe 2 at a spacing from the inner walls of the support pipe, support devices are expediently provided. However, it may be sufficient to provide the filter hose with folds and to allow the radially outwardly positioned fold tips to rest against the inner wall of the support pipe.

The filtering device 1 is preferably used in internal combustion engines for filtering the combustion air. In order to prevent that, after the internal combustion engine has been turned off, a backflow of unburned combustion residues into the intake manifold and farther into the atmosphere occurs, in the support pipe 2 of the filtering device an adsorber unit 7 is arranged which adsorbs in particular hydrocarbons. In the embodiments according to FIGS. 1 to 3, different variants for the arrangement and constructive design of the adsorber unit 7 are illustrated while support pipe 2 and filter hose 3 in all embodiments are identical.

According to FIG. 1, the adsorber unit 7 is embodied as an adsorber ring that is arranged adjacent to the flow outlet 6 in the annular chamber 4 and expediently fills it completely. The adsorber unit is advantageously of sufficient porosity so as not to impair, or at least not significantly, the regular flow of the purified fluid and to prevent an undesirable pressure loss at the adsorber unit.

Figure 2:
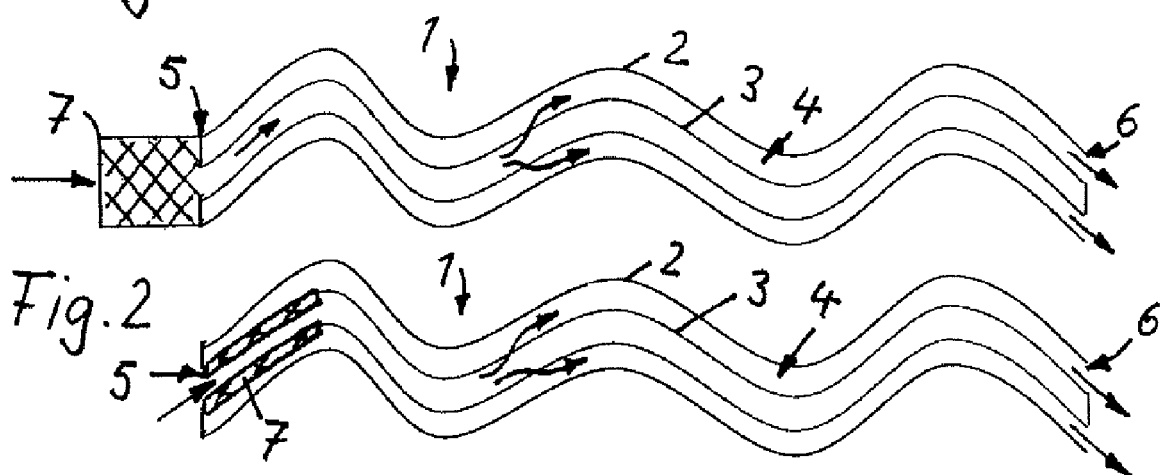
FIG. 2 a filtering device in an embodiment variant in which a block-shaped adsorber unit is immediately arranged upstream of the flow inlet of the support pipe and of the filter hose.

According to FIG. 2 the adsorber unit 7 is embodied as an adsorber block that is arranged immediately upstream of the flow inlet 5. The supplied combustion air is supplied through the adsorber block 7 wherein according to one embodiment in the adsorber block flow passages for the unimpaired flow of the supplied combustion air that is to be purified are provided. After having passed the adsorber unit 7 the combustion air flows into the interior of the filter hose 3 and propagates axially wherein the filtration takes place at the inner side of the filter hose as soon as the fluid passes the filter hose walls radially from the interior to the exterior. The purified medium is subsequently guided away through the annular chamber 4 and the flow outlet 6. The adsorber block 7 is expediently secured at the wall of the support pipe 2.

Figure 3:
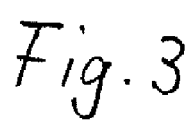
FIG. 3 a further embodiment variant of a filtering device in which the adsorber unit is embodied as adsorber shells that are arranged adjacent to the flow inlet cross-section at the inner side of the filter hose.

In the embodiment according to FIG. 3 the adsorber unit 7 is embodied as a single or multi-part shell that lines in the circumferential direction the inner side of the filter hose 3 adjacent to the flow inlet 5. This embodiment has the advantage that a free flow passage through the adsorber unit is provided through which the combustion air can flow without impairment.

The filtering device is suitable in particular for the filtration of combustion air in internal combustion engines. However, an application for the filtration of air in the interior of the motor vehicle or generally for the filtration in connection with motor vehicles is possible.

The invention claimed is:

1. A filtering device comprising:
   a filter housing in the form of a support pipe defining within said support pipe a selected filter element course geometry;
   a filter element comprising a flexible filter hose of yielding filter material extending axially in said support pipe along said course, said flexibility enabling said filter element to follow and conform to said selected course geometry;
   an adsorber unit arranged in a flow path through the filtering device of a fluid to be purified in the filtering device;
   wherein said filter hose has a filter wall that separates radially an unfiltered side from a filtered side of the filtering device;

wherein between an outer side of said filter wall of said filter hose and an inner wall of said support pipe an annular chamber for flow of the fluid to be purified is formed;

wherein said adsorber unit is arranged in or on said support pipe;

wherein said filter element is adapted to conform to a variety of course geometries by way of its flexibility, and wherein the filter housing is in fluid communication with an air intake in an internal combustion engine.

2. The filtering device according to claim 1, wherein said adsorber unit is arranged within said support pipe.

3. The filtering device according to claim 1, wherein said adsorber unit is an adsorber block that fills a flow cross-section of said support pipe.

4. The filtering device according to claim 1, wherein said adsorber unit is integrated into said filter hose.

5. The filtering device according to claim 4, wherein said adsorber unit lines an inner side of said filter wall of said filter hose but leaves open an axial flow path in said filter hose.

6. The filtering device according to claim 1, wherein said adsorber unit is arranged outside of said support pipe and directly adjacent to a flow inlet or a flow outlet of said support pipe.

7. The filtering device according to claim 1, wherein said adsorber unit is arranged adjacent to an end face of said filter hose that is located at a flow inlet of said support pipe.

8. The filtering device according to claim 1, wherein said adsorber unit is arranged adjacent to an end face of said filter hose that is located at a flow outlet of said support pipe.

9. The filtering device according to claim 1, wherein the fluid to be purified flows through said filter hose radially from an interior to an exterior of said filter hose and said annular chamber is said filtered side.

10. The filtering device according to claim 1, wherein a filter material of said filter hose contains fibers of adsorber material.

11. The filtering device according to claim 10, wherein said fibers have a filtering function.

12. The filtering device according to claim 1, wherein said adsorber material contains carbon fibers.

13. The filtering device according to claim 12, wherein said fibers have a filtering function.

* * * * *